Jan. 2, 1962 J. FAISANDIER 3,015,310
HOLLOW PISTON JACK AND CONTROL VALVE
Filed July 7, 1958

Inventor
J. Faisandier

United States Patent Office 3,015,310
Patented Jan. 2, 1962

3,015,310
HOLLOW PISTON JACK AND CONTROL VALVE
Jacques Faisandier, 32 Blvd. Felix-Faure à Chatillon-sous-Bagneux, France
Filed July 7, 1958, Ser. No. 747,081
Claims priority, application France July 12, 1957
7 Claims. (Cl. 121—38)

The invention relates to hydraulic jacks in which the distributor slide-valve is housed inside the piston.

An object of the invention aims at overcoming the drawbacks inherent in this type of apparatus, which stem from the fact that input movement, namely the slide-valve controlling movement, takes place in the same direction as output movement; this has hitherto led to the execution of arrangements wherein the input shaft is extended beyond the free end of the hollow piston-rod. To obviate this, the invention provides for transmission of the input movement via the articulation transmitting the output movement.

A further object of the invention aims at solving the problem both of limiting slide-valve movement relative to the piston and of providing adjustment for the neutral position without departing from the method of transmitting ingoing movement referred to precedingly.

Yet a further object of the invention is to provide a remedy against the curbing effect that could result from a slight deviation of the fixed point in relation to the plane along which the movement transmitting levers are displaced.

Another object of the invention is to facilitate machining of the distributor head by replacing the conventional apertures bored into the bulk of the metal by more easily machined milling cuts.

An embodiment of the invention is described hereinafter wherein are combined the various improvements enumerated precedingly, it being clearly understood, that the invention is by no means confined to the specific details described with reference to the accompanying drawing, said description and illustration being provided by way of example only and not in any limiting sense on the scope of the invention.

Figure 1:
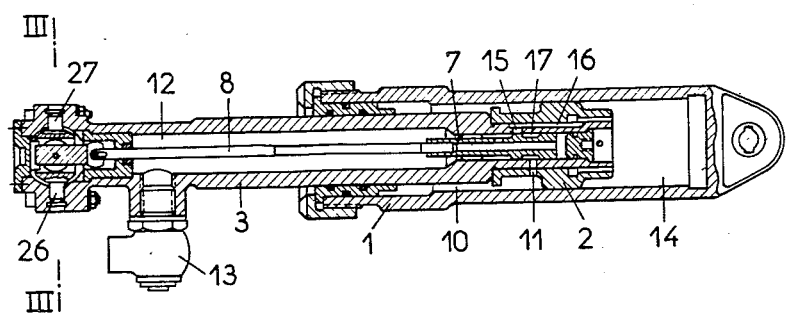
FIG. 1 is a longitudinal section view of a hydraulic jack according to the invention.

In these figures, 1 designates the fixed body of the jack, 2 the piston head, 3 the hollow rod carrying the piston head. The hollow rod 3, at the end opposite the piston head 2, is provided with hollow trunnions 18 and 19 on which are articulated, by means of the roller bearing 4 and 5, links 31 and 32 for transmission of the output movement, and 6 is a lever which transmits the input movement.

The distributor slide-valve 7 (FIG. 1) controlled by the rod 8, is disposed inside the bore of the hollow piston-rod 3. Delivery of liquid under pressure takes place via the tubing 9, the annular space 10 and the port 11, while the return path to the reservoir is along the annular space 12 and the tubing 13. Intercommunication of the bore in which the slide-valve 7 moves and the working chamber 14 of the jack is via port 15 and, according to invention, by the milled cut 16 effected on the piston-rod 3.

In operation of the device thus far described, the slide valve 7 being in the neutral position as represented, a slight movement of the slide valve towards the right in response to an input movement uncovers the port 15 and connects the chamber 14 to the reservoir thus allowing displacement of the piston head 2 towards the right under the action of the pressure on the left side of the piston head 2. In contradistinction, a slight movement of the slide valve 7 to the left in response to an input movement in the reverse direction places the port 11 in communication with the port 15 through the annular chamber 17 of the slide valve thus conveying the pressure to the chamber 14 and promoting displacement of the piston head 2 towards the left.

Figure 2:
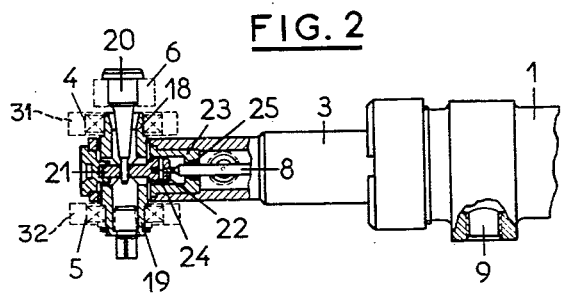
FIG. 2 is a profile view, with partial longitudinal sectioning along a plane perpendicular to the plane of FIG. 1.
Figure 3:
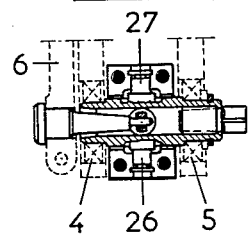
FIG. 3 is a cross-section along the lines III—III in FIG. 1.

Referring to FIGS. 2 and 3 it will be seen that the piston rod 3 is articulated on to the output transmission by means of the hollow trunnions 18, 19 carrying the roller-bearings 4, 5. The trunnion 18 is freely traversed by a finger 20 mounted on the lever 6 transmitting input movement. The finger 20 acts on the slide 21 and imparts to the same a transverse movement, the slide 21 is guided by by a ball 22 which slides inside a bore embodied in the part 23 which is integral with the rod 3. The rod 8 of the slide-valve is articulated on to the ball 22 by means of the spindle 24. The rod 8 passes freely through the hollow rod 3, the flexible seal 25 allowing for a certain amount of movement.

According to the invention, the extremity of the finger 20 which passes through the slide 21 has its longitudinal axis slightly eccentric with respect to the longitudinal axis of the finger itself, so that rotation of the finger about its axis allows modifying the position of the slide-valve, thus providing adjustment of the neutral position.

Furthermore, it is clear that movement of the finger 20 inside the bore of the hollow trunnion 18 is restricted by the internal shape of this bore. By virtue of the fact that the finger 20 is conically shaped, it consequently becomes possible, by varying the degree to which the finger 20 is thrust in along the direction of its axis, to slightly modify the amplitude of the movement of the finger 20 inside the bore, and hence that of the distributor slide-valve.

Lastly, according to the invention, the trunnions 18, 19 are not articulated directly with the piston rod 3, but through the intermediary of trunnions 26, 27, the axis of rotation of which is perpendicular to that of the trunnions 18, 19. By these means, suspension by universal joint is obtained.

What I claim is:

1. A pressure operated jack comprising a movable hollow piston and a cylinder in which said piston operates, a hollow piston rod extending from said piston, a slide-valve distributor slidingly disposed in said hollow piston, control means external to the jack to transmit an input movement, a control rod slidably extending through said hollow piston rod and operatively connected to said control means and to said slide-valve whereby said slide valve and said control rod may slide longitudinally with respect to said piston rod and piston and also move bodily with said piston and piston rod, hollow trunnion means on said hollow piston rod arranged substantially perpendicular to the direction of movement of said hollow piston and rod, and a transmission member freely passing through said hollow trunnion means and operatively associated with said control means externally of said jack whereby said control rod is operatively connected with said control means.

2. A jack according to claim 1 in which the transmission member is a movable finger arranged perpendicular to the direction of movement of the piston and operatively connected to said control means for translatory movement in a direction parallel to said control rod.

3. A jack according to claim 1 in which the transmission member is operatively associated with the rod by eccentric means.

4. A jack according to claim 1 in which the transmission member is a movable finger arranged perpendicular to the direction of movement of the piston and wherein the finger extremity cooperates with the control rod in an eccentric relationship to the axis of the finger whereby rotation of the finger varies the position of the slide-valve.

5. A jack according to claim 1 characterized by the fact that the hollow piston includes at least one passage through which liquid circulates which is formed by a longitudinally milled cut.

6. A jack according to claim 1, in which means are provided to adjust the amplitude of the displacement performed by said transmission member inside said hollow trunnion means as a consequence of said input movement.

7. A jack according to claim 1 in which said hollow trunnions means are mounted on said piston rod by second trunnions means, the axis of which is perpendicular to the axis of said first named trunnions means.

References Cited in the file of this patent
UNITED STATES PATENTS

| | | |
|---|---|---|
| 1,600,376 | Trotter | Sept. 21, 1926 |
| 1,601,009 | Trotter | Sept. 28, 1926 |
| 1,732,813 | Kasley | Oct. 22, 1929 |
| 1,983,744 | Dock | Dec. 11, 1934 |
| 2,515,795 | Patrignani | July 18, 1950 |
| 2,518,925 | Nussbaum | Aug. 15, 1950 |
| 2,547,594 | Ohlsson | Apr. 3, 1951 |
| 2,865,336 | Leboucher | Dec. 23, 1958 |
| 2,903,233 | Magor | Sept. 8, 1959 |